UNITED STATES PATENT OFFICE.

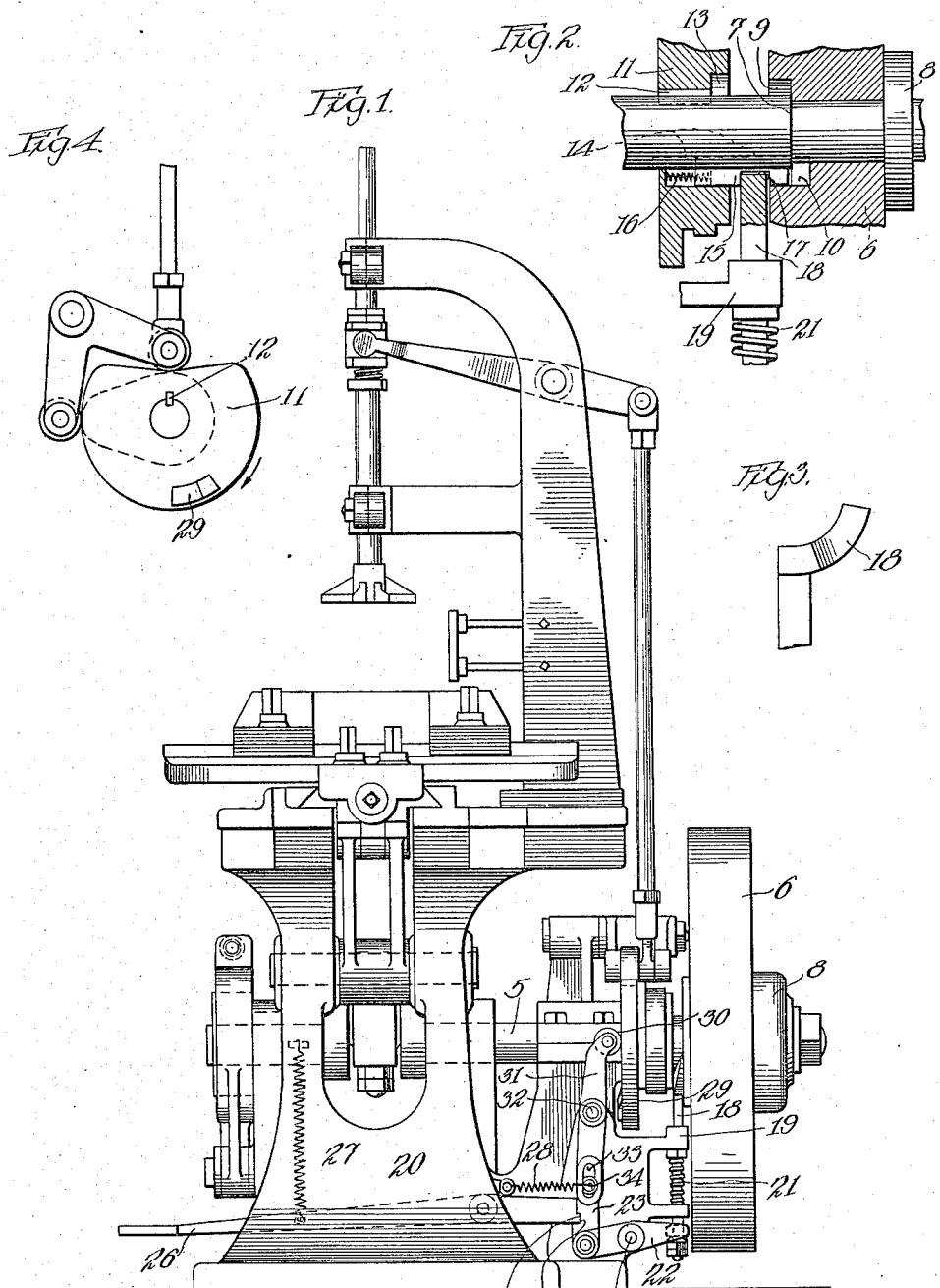

EDWARD KATZINGER, OF CHICAGO, ILLINOIS, ASSIGNOR TO EDWARD KATZINGER COMPANY, OF CHICAGO, ILLINOIS, A CORPORATION OF ILLINOIS.

AUTOMATIC CLUTCH-RELEASE.

1,170,543.  Specification of Letters Patent.  Patented Feb. 8, 1916.

Original application filed June 27, 1914, Serial No. 847,612. Divided and this application filed February 20, 1915. Serial No. 9,509.

*To all whom it may concern:*

Be it known that I, EDWARD KATZINGER, a citizen of the United States, residing in Chicago, in the county of Cook and State of Illinois, have invented certain new and useful Improvements in Automatic Clutch-Releases, of which the following is a specification.

My invention relates to automatic releases for clutches of punching and forming presses and the like, this application being a division of my application for corner folding machines for pans and the like, filed June 27, 1914, Serial No. 847,612.

The object of this improvement is the provision of simple and efficient means for automatically releasing the clutch of punching, bending and forming presses and the like, at the end of one cycle of movement of the press parts.

Other objects will appear hereinafter.

The invention consists in substantially the combinations and arrangement of parts hereinafter described, shown in the accompanying drawing forming a part of this specification, and more specifically set forth in the appended claims.

In the drawing,—Figure 1 is a side elevation of a press equipped with my invention; Fig. 2 is an enlarged fragmental section taken through the fly wheel and clutch of the press; Fig. 3 is a fragmental side view of a cam used in the clutch of the press, and Fig. 4 is a side elevation of a cam movement used in the construction.

I have shown my invention as applied to a corner bending machine such as is described in my application, Serial No. 847,612, filed June 27, 1914. This improvement, however, is equally adaptable to all forms of presses used for forming, bending or punching sheet metal. In such presses, there is provided mechanism whereby the operator moves a foot lever to connect the clutch to throw the press into operation. At the end of one cycle of the operation, the clutch is so designed that it will automatically be stopped, provided the operator has lifted his foot from the trip lever. If, however, the operator has not lifted his foot, the operation of the press will continue until the operator does lift his foot. My invention consists in providing means whereby the operation of the press will cease at the end of one cycle of movement thereof, regardless of whether the operator has freed the trip lever or not. The clutch shown is a clutch such as is ordinarily used in presses of this type, and comprises a main shaft 5 having a driving wheel 6 which is ordinarily the fly wheel of the press, also. The fly wheel is rotatively mounted on the shaft and held between a shoulder 7 and a locking collar 8 on the shaft. On one side of the wheel 6 is formed an annular groove 9, and at the inner side of the groove is formed one or more notches 10. The notches 10 are adapted to receive the clutch, described later, for connecting the shaft to be rotated with the wheel 6.

The clutch proper comprises a hub member 11, locked on the shaft 5 by means of a key 12, or its equivalent. The hub member 11 is provided with an annular groove 13 on its face opposite the wheel 6. In the shaft 5 is provided a keyway 14, in which is slidably mounted a key 15. The keyway 14 is adapted to extend substantially through the hub 11 and for a distance into the wheel 6, so that the key 15 may move into and out of recess 10 to lock the wheel 6 to the shaft 5. The key 15 is provided with a spring 16, which tends to press the key into notch 10. The key 15 is provided with a notch 17, which is engaged by a cam 18, and the latter is mounted in suitable guides 19 on the frame 20 of the press. A spring 21 is mounted on the cam 18 and is adapted to normally press the cam into notch 17 of the key 15. The arrangement is such that when the cam 18 is withdrawn from notch 17, the spring 16 will move the key 15 into notch 10 to lock the wheel 6 on the shaft 5. Upon making one rotation, notch 17 is engaged by the cam surface of cam 18, thereby moving the key 15 to the position shown in Fig. 2 and thereby withdrawing said key from notch 10, to unlock the wheel 6 from shaft 5. This unlocking of wheel 6 permits the shaft 5 to cease its rotation.

The lower end of cam 18 is connected to a lever 22 which is pivoted to the frame 20 near its central portion. The other end of lever 22 is pivoted to a link 23 and the latter is provided with a notch 24 in one side thereof. The notch 24 is engaged by a projection 25 on the trip lever 26, so that upon downward movement of the trip lever 26 the link 23 and its corresponding end of lever 22 will be moved upwardly thereby moving the opposite end of said lever downwardly. This movement effects moving the cam 18 downwardly to disengage its upper end from notch 17, to permit the operation of the clutch. A spring 27 is connected with the trip lever 26, so that as soon as the operator's foot is removed from the trip lever said lever will move to its normal position, permitting spring 21 to move cam 18 to its normal position.

The link 23 is provided with a spring 28, which normally holds the notch 24 in engagement with the projection 25. On the hub 11, I provide a cam 29 which is engaged by a roller 30 on one end of a lever 31, and the latter is pivoted as at 32 to the frame 20. The other end of lever 31 is provided with a slot 33, which engages a pin 34 on link 23, so that upon the shaft 5 being rotated, cam 29 will move the lever 31 on its pivotal point, thereby swinging link 23 on its pivotal connection with lever 22 away from trip lever 26, so that the spring 21 will be free to return the cam 18 to its normal position to unlock the cam 15 from slot 10, whether the operator has removed his foot from lever 26 or not. This means provides a safety device whereby the press can only operate through one cycle of its movement, regardless of whether or not the operator has removed his foot from trip lever 26 after once having tripped the clutch to start the machine.

While I have illustrated and described the preferred form of construction of my invention, I do not desire to be limited to the precise details set forth but desire to avail myself of such variations and changes as come within the scope of the appended claims.

I claim:

1. The combination with the main shaft and driving wheel of a press, of a clutch on said shaft and adapted to engage said wheel; a cam engaging said clutch; a spring normally holding the cam in engagement with the clutch; a lever connected at one end with said cam; a link pivoted to the other end of said lever and having a notch therein; a trip lever having one end engaging said notch; and means operated by said shaft and connected to said link adapted to disconnect said link from said trip lever.

2. The combination with the main shaft and driving wheel of a press, of a clutch on said shaft and adapted to engage said wheel; a cam engaging said clutch; a spring normally holding the cam in engagement with the clutch; a lever connected at one end with said cam; a link pivoted to the other end of said lever and having a notch therein; a trip lever having one end engaging said notch; a cam on said shaft; a lever engaging said last-mentioned cam and connected with said link, adapted to swing the latter laterally and disconnect the link from said trip lever.

3. The combination with the main shaft and drive wheel of a press, of a clutch on said shaft adapted to engage said wheel; a cam engaging said clutch; a spring normally holding the cam in engagement with the clutch; a lever connected at one end with said cam; a link pivoted to the other end of the lever and having a notch in its side; a trip lever having a portion engaging said notch; a lever in substantial alinement with the link, a slot and pin connection between the link and said last mentioned lever; and a cam on the main shaft adapted to move the last mentioned lever and link to disengage the latter from said trip lever.

In testimony whereof I have signed my name to this specification, in the presence of two subscribing witnesses, on this 18th day of February, A. D. 1915.

EDWARD KATZINGER.

Witnesses:
THOMAS COLSON,
CHARLES H. SEEM.